United States Patent [19]
Zahn

[11] Patent Number: 4,713,981
[45] Date of Patent: Dec. 22, 1987

[54] REMOTE ACTUATING MECHANISM

[75] Inventor: Werner Zahn, Altlussheim, Fed. Rep. of Germany

[73] Assignee: Deere & Company, Moline, Ill.

[21] Appl. No.: 881,886

[22] Filed: Jul. 3, 1986

[30] Foreign Application Priority Data

Jul. 3, 1985 [DE] Fed. Rep. of Germany ....... 3523762

[51] Int. Cl.$^4$ .............................................. G05G 11/00
[52] U.S. Cl. ........................................ 74/479; 74/102; 74/491; 74/526; 172/9
[58] Field of Search ................. 74/479, 526, 102, 436, 74/491, 480 R; 280/461 A; 180/321, 324; 172/7, 9

[56] References Cited

U.S. PATENT DOCUMENTS 2,509,639 5/1950 Harker et al. ......................... 74/436
3,117,465 1/1964 Eiermann ........................... 74/479 X
4,478,104 10/1984 Page et al. ............................. 74/479

FOREIGN PATENT DOCUMENTS 131711 1/1985 European Pat. Off. .
8425315 2/1986 Fed. Rep. of Germany .

Primary Examiner—Allan D. Herrmann

[57] ABSTRACT

A remote actuating mechanism, in particular for actuating a control lever of a three-point implement hitch, has a transmission unit with a slide which is movable longitudinally by means of a swingable driver. The driver can be held in an inoperative position and has a spring-loaded driving pin by means of which a positive connection can be obtained between the driver and the transmission unit in any position of the slide. The positive connection is possible, however, only in a single spatial relationship between the driver and the slide. In the inoperative position, the driver is separated from the slide and a lock is provided to prevent unintentional actuation.

9 Claims, 3 Drawing Figures

REMOTE ACTUATING MECHANISM

BACKGROUND OF THE INVENTION

1. Field of the Invention

The invention relates to a remote actuating mechanism having a driver, a transmission unit and a remote actuating lever.

2. Description of the Prior Art

Remote actuating mechanisms are known for a variety of purposes. European Patent Application-No. A2-0 131 711 describes a remote actuating mechanism for a lever of a three-point implement hitch of an agricultural tractor which is used for shifting the lever, arranged in the driver's cab of the tractor, from outside the cab, so that draft links belonging to the three-point implement hitch can be raised or lowered without an operator having to climb onto the tractor. It is often the case in agricultural applications that, depending upon the design of the control and adjustment equipment of the three-point implement hitch, the lever is permitted to be moved only within a certain range. This is dependent, inter alia, on whether the adjusting device can carry out position adjustment and tractional resistance adjustment or not. The controls and adjustment equipment are designed such that selection of position adjustment causes shifting of the lever to produce a proportional movement of the draft links over their entire range. Selection of tractional resistance adjustment causes shifting of the lever to first produce no movement of the draft links while the lever passes through a dead range located at the beginning of its travel and an uncontrolled movement of the draft links in an adjustment range that follows the dead range so long as there is no tensile stress at the draft links. Uncontrolled movement of the drafts links is undesirable when operating the remote lever, therefore it is advantageous to design the lever such that it cannot be brought into the adjustment range when tractional resistance adjustment has been chosen as the kind of adjustment.

The remote actuating mechanism of European Patent Application-No. A2-0 131 711, uses a driver in the form of a pinion and a transmission unit in the form of a rack with a Bowden cable attached thereto. The pinion is provided with teeth only over part of its circumference, is rotatably mounted in a housing, and can be connected to a remote actuating lever by means of a simple pivot connection in opposition to the action of a spring element. The rack takes the form and function of a slide which is longitudinally movable in the housing or through engagement with the pinion, in which case the rack supplies input to the cable. Two stops which limit the range of swing of the remote actuating lever to a predetermined range which corresponds to the dead range are provided on the housing. In another embodiment of this remote actuating mechanism, a pawl engages in the pinion as soon as the rack is located at the end of the dead range. Outside the dead range the pawl is held by a special recess into engagement with the rack so that the pinion can be turned neither forward nor backward.

This remote actuating mechanism suffers from drawbacks presented by pivotal engagement of the pinion with the remote actuation mechanism. First, supplying and maintaining sideways force to engage the pinion complicates operation of the lever. Furthermore, the pivot connection can be bypassed by placing the remote actuating lever laterally against the pivot so that the rotary movement of the pinion leads to swinging movement of the remote actuating lever and the rack is moved beyond the predetermined range. Likewise, the remote actuating lever can also be pushed into frictional contact against the pinion and hence the rack can be shifted beyond the predetermined range.

It is true that the last two drawbacks are avoided in the embodiment with the pawl. The cost of adding the pawl is unjustifiably high, however. Furthermore, after a long period of use wear, at the pinion, the rack, and the tip of the pawl will cause this locking device to function improperly and will lead to blocking of the remote actuating mechanism.

SUMMARY OF THE INVENTION

Therefore, it is an object of this invention to provide a remote actuation mechanism that is simple in construction and easily operated over a limited control range.

According to the invention, these objectives have been met by rigidly attaching a remote actuating lever to a driver that is connectable to the transmission unit in only one relationship of engagement. In this way, the driver can always only be connected to the transmission unit in the same position and movement of the transmission unit beyond the intended actuating range is not possible. This measure can be achieved in that the driver and the transmission unit fit together only in one of many possible positions or that there is only a single possibility of connection.

In a further embodiment the invention uses a driver having a spring loaded driving pin to engage an engagement formation, in the form of a recess, on a slide mechanism that is included as part of the transmission unit. Thus, the single recess in the slide into which the spring loaded driver pin can be inserted is sufficient to attain an always well-defined connection of the drive with the slide. The spring loading ensures positive coupling and, on engagement of the driver pin, sudden relaxation of the compression spring associated therewith provides an acoustic and/or sensible indication that positive coupling has taken place.

In any position of the transmission unit and, hence, also of the slide, the remote actuating lever can be swung together with the driver out of an inoperative position, where the driver does not engage the recess, towards the slide and the recess. Since the driver pin is spring-loaded, it can be moved on the surface of the slide into the predetermined range, so that it engages in the recess as soon as it reaches it. Accordingly, it is of no importance what position the driver pin happens to take up with respect to the slide, since it can be brought into engagement with the slide through the movement of the remote actuating lever. Thus automatic engagement of the driver pin is produced in a simple manner by the spring biasing of the driver pin towards the recess. Positive coupling is produced between the driver pin and the slide in the quickest possible manner when the initial position of the slide is prearranged in such manner that the path of movement of the driver pin coincides with the recess along the shortest route.

In a yet further embodiment, the remote actuating lever can be brought into an inoperative position and held therein, so that no initiation of force on the driver and the transmission unit can take place as a result of unintentional operation or accidentally applied forces.

The remote actuation mechanism according to the invention is put to a suitable possible use when it is employed for operating the three-point implement hitch of an agricultural tractor and, in particular, when the operation of the three-point implement hitch can take place from the implement attached to the tractor and optimum control of this implement can be carried out by a person who is on it. An application of this kind is very advantageous say in the control of a potato planting machine, a plant setting machine, a full potato harvester or a cultivator, since the person sitting on a machine of this kind can perceive better and more quickly than the person operating the tractor whether the machine must be put deeper into the ground or be lifted further out of it in order to obtain the best possible covering of plants or the smallest possible production of clods.

DETAILED DESCRIPTION OF THE PREFERRED EMBODIMENT

Figure 1:
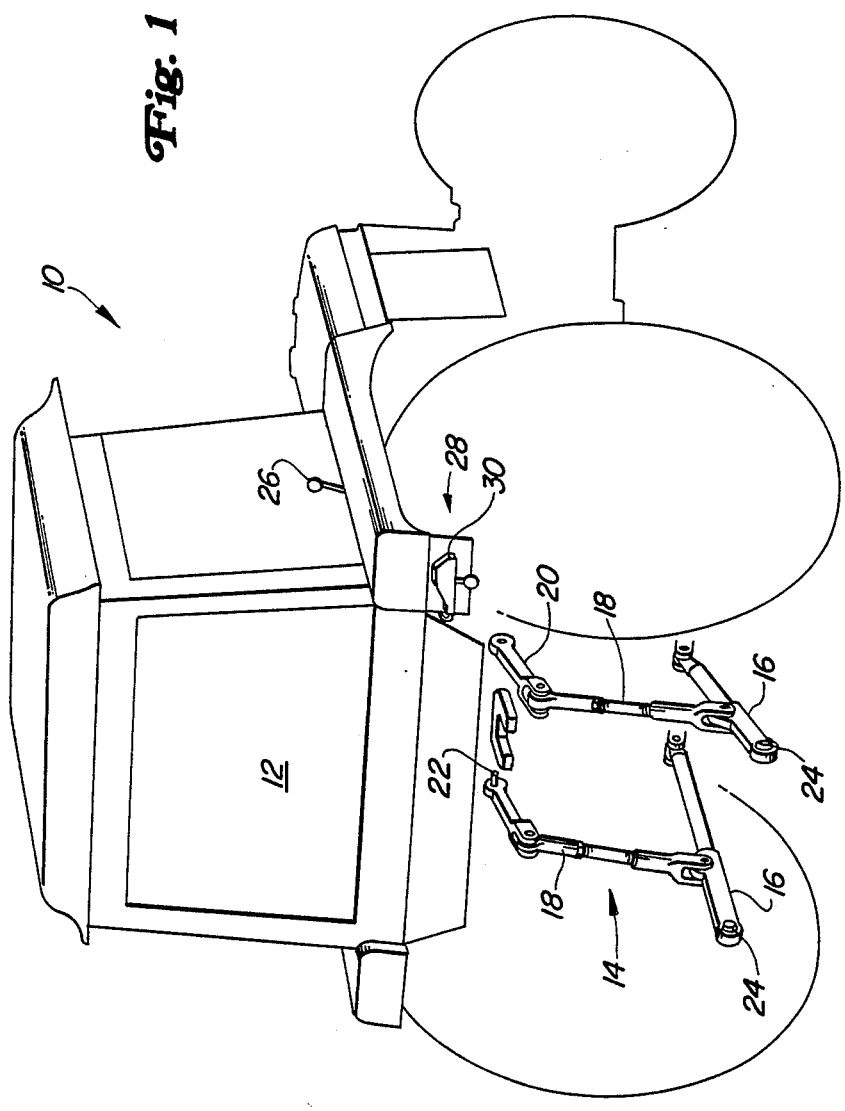
FIG. 1 is a diagrammatic representation of an agricultural tractor with remote actuating mechanism.

An agricultural tractor 10 with a cab 12 shown in FIG. 1 in outline is provided at its rear end with a three-point implement hitch 14 by means of which connection to an implement to be attached, but not shown, can be established. The implement concerned may be a plow, a planter, a harrow or some other machine.

The three-point implement hitch 14 has two draft links 16 which are connected via lifting links 18 and lifting arms 20 to a rock shaft 22 and have ball bearing eyes 24 at the ends where the implement will be located. The rock shaft 22 itself can be turned by means of a lifting cylinder (not shown) acting eccentrically on it, while the draft links 16 can swing vertically about a spring bar, not visible in the drawing. The swinging movement is produced by the turning rock shaft 22 and transmitted to the draft links 16 via the lifting arms 20 and the lifting links 18. In addition, there belongs to the three-point implement hitch 14 a top link not included in the drawing, by means of which the attached implement is held in a vertical or approximately vertical position during the swinging action of the bottom links 16.

For controlling the rotation of the rock shaft 22, a control device (not shown) with a control lever 26 is provided in the cab 12 of the tractor 10 and impulses can be fed into the control device also by way of the spring bar as well as through the control lever 26.

An adjusting device, which is likewise not shown, is superimposed on the control device and enables the attached implement to be operated at least in a manner analogous with position adjustment and tractional resistance adjustment. If necessary, a mixture of the two kinds of adjustment, namely mixed adjustment, may also be provided. In this connection, position adjustment means that the attached implement is always held in the same vertical position with respect to the tractor 10, this position being determined directly via the position of the control lever 26, so that the attached implement always maintains the same working depth. Tractional resistance adjustment, on the other hand, means that the attached implement always maintains a working depth which corresponds to a certain tractional resistance when it is being drawn through the soil. The tractional resistance is transmitted to the adjusting device through a proportional bending of the spring bar and causes in this device the initiation of a process of raising or lowering of the three-point implement hitch 14.

In known design, the control lever 26 is guided in a slotted guide (not shown) and is movable within a predetermined range. If position adjustment has been chosen as the kind of adjustment, then a raising or lowering of the draft links 16 takes place in proportion to the amount by which the control lever 26 is shifted in the slotted guide, and in fact in such manner that draft links 16 are located in their lowest position when the control lever 26 is against the front end of the slotted guide and adopt their highest position when the control lever 26 is at the rear end of the guide.

On the other hand, the range is divided into a dead range and an adjustment range when tractional resistance adjustment has been chosen as the kind of adjustment, the dead range extending from the front end of the slotted guide and the adjustment range from the rear end of the guide. As long as tractional resistance adjustment has been chosen, a shifting of the control lever 26 in the dead range does not have any effect on the three-point implement hitch 14. A shifting of the control lever 26 in the adjustment range leads to an uncontrolled raising or lowering of the unloaded bottom links 16, since in the case of tractional resistance adjustment their vertical swinging movement takes place almost exclusively in dependence upon the impulses experienced through the spring bar or some other tractional resistance transmission element.

Finally, a remote actuating mechanism or system 30 is provided in a rear outside area 28 of the agricultural tractor 10, this mechanism being connected to the control lever 26 via a Bowden cable 32 (see FIG. 2) or some other linkage and being able to transmit a movement to the control lever to a limited extent, so that the draft links 16 of the three-point implement hitch 14 can not only be raised and lowered directly from the cab 12 by means of the control lever 26, but also indirectly from outside the cab 12 by means of the remote actuating mechanism 30. This is particularly important for being able to bring the height of the draft links 16 to the correct coupling height when the implement is attached, which is very difficult in certain circumstances from the cab 12, but can be carried out very easily if a person operating the three-point implement hitch 14 is standing directly beside the implement to be attached. However, in order to prevent the control lever 26 from being moved into the adjustment range through the remote actuating mechanism 30 when tractional resistance adjustment has been chosen as the kind of adjustment, the remote actuating mechanism 30 is constructed as follows and as can be seen from FIGS. 2 and 3.

Accordingly, the remote actuating mechanism 30 is made up essentially of a housing 34, a cover 36, a slide 38, a driver 40, a lever 42 and a lock 44.

Figure 2:
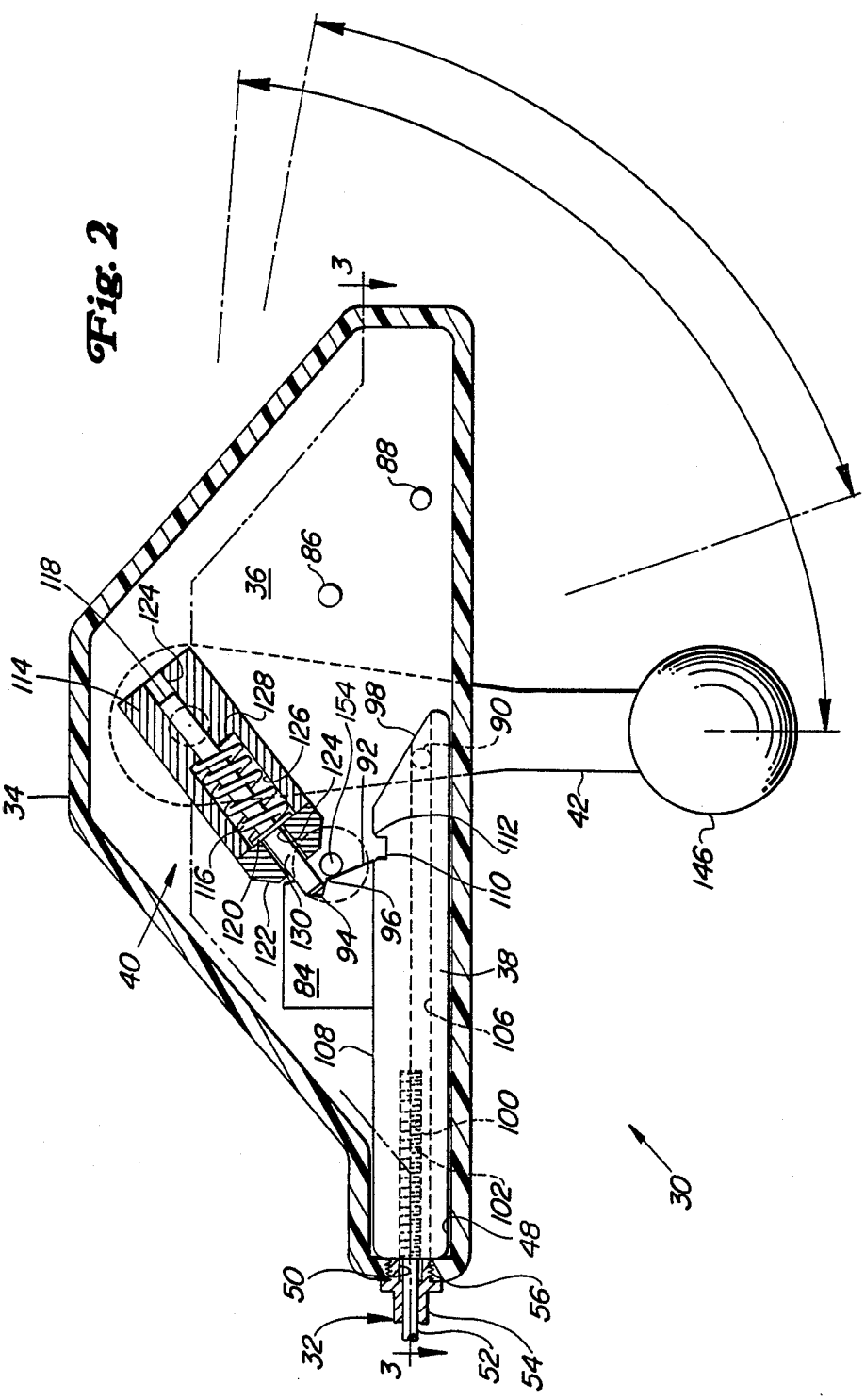
FIG. 2 shows the remote actuating mechanism in front elevation and in section with the mechanism in an inoperative position.
Figure 3:
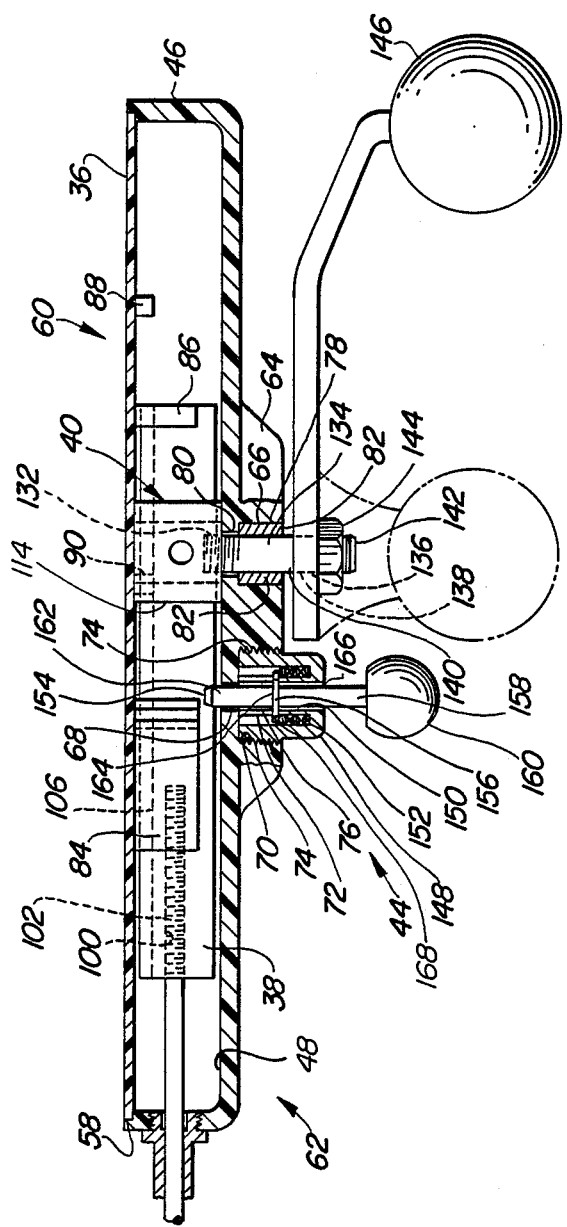
FIG. 3 shows the remote actuating mechanism in an operative position in plan view and in section along line 3—3 in FIG. 2.

It is pointed out that in reality the lever 42 shown in FIG. 2, is located in front of the housing 34, when looking in the direction of the drawing, and has only been included in the drawing in order to indicate its relative position with respect to the slide 38 and the driver 40.

The housing 34 is made of a plastic having stability of shape and takes the form of a trapezium placed on top of a rectangle, the wide side of the trapezium standing on the rectangle and the rectangle extending beyond the trapezium at one end to form a zone 48. The housing 34 has a rim 46 within which the cover 36, the slide 38 and the driver 40 are arranged. In zone 48 the housing 34 has an opening 50 through which a cable element 52 of the previously described Bowden cable 32 extends. A sheath 54 of the Bowden cable 32 is rigidly connected to the housing 34 by means of a screw bushing 56 and consequently gives the transmission pulling or pushing capability. The Bowden cable 32, the slide 38, the cable element 52, the sheath 54 and the screw bushing 56 are components of the transmission unit or linkage. The rim 46 has a recess 58 at its inner periphery which serves for positive or closely conforming reception of the cover 36, so that it is always held in the same position with respect to the housing 34. In this embodiment, that side of the housing 34 which is located towards this recess 58 constitutes the back 60 of the housing. On a side opposite this side, that is on the front 62, a raised part 64 is provided which effects a strengthening of the housing 34 and in which a stepped bore 66 and a bore 68 are provided. Bore 68 is surrounded concentrically by an annular groove 70 and a wall 72 is left between the annular groove 70 and the bore 68. The annular groove 70 is provided with an internal thread 74 and the wall 72 is pierced in two places 76 diametrially opposite each other. The stepped bore 66 has a zone 78 of large diameter and a zone 80 of small diameter, the zone of large diameter 78 being located towards the front 62 and the zone of small diameter 80 towards the rear 60. In the zone of large diameter 78 there is inserted a bearing bushing 82, the inner diameter of which corresponds to the inner diameter of the stepped bore 66 in the zone of small diameter 80. The bearing bushing 82 may consist, for example, of a wear-resistant plastic or of gunmetal and terminates flush with the housing 34 at the front 62.

The cover 36, which may likewise be made from a plastic with stability of shape or from sheet metal, has the same shape as the housing 34, but is a little smaller in its over-all size so that it fits into the recess 58 of the rim 46. It is made relatively thin and is provided on its inside, which faces the front 62 of the housing 34, with a retaining element 84, a stop 86 and two guide studs 88 and 90, the retaining element 84 and the stop 86 extending almost over the entire height of the rim 46 and the two guide studs extending over about one third of the height of the rim 46. The retaining element 84, the stop 86 and the guide studs 88, 90 may be cemented or screwed onto the cover 36 or be made in one piece with it.

The retaining element 84 has on its right side in the drawing, which is towards the stop 86, an inclined surface 92 which is interrupted by a groove 94. The groove 94 terminates on its lower side in the included surface 92 by way of a chamber 96. The stop 86 may be in the form of a pin or the like and is preferably round in cross section. The guide studs 88, 90 are likewise made in the form of pins or the like. They may also, however, be shaped after the fashion of guide shoes. The function of the guide studs 88, 90 is explained in detail later on. With respect to that portion of the rim 46 of the housing 34 which is located at the bottom in FIG. 2, the groove 94 in the retaining element 84 and the stop 86 are the same distance away. The two guide studs 88, 90 also lie on a line disposed parallel to this portion of the rim 46.

The cover 36 and the housing 34 may either be cemented together or filled in with sealing compound or they may be held together by means of screws. For the sake of clarity, the method of joining is not shown in the drawing.

As can be seen, in particular from FIG. 2, the slide 38 has the cross section of an irregular trapezium with rounded edges. Its height corresponds to the internal dimension of the housing 34 in the zone 48 of the extended rectangle and its width corresponds substantially to the height of the rim 46. The length of the slide 38 extends from the left end of the extended rectangle 48 approximately as far as the center of the trapezium, projected onto the rectangle. More particularly, this length is determined in such manner that the slide 38 is still located below the retaining element 84 even when it can no longer be shifted further to the right. The end zone of the slide 38 on the right in the drawing extends in an inclined surface 98, starting from the bottom edge towards the zone 48 of the extended rectangle, and in fact at an angle of about 45 degrees. From the end of the slide 38 on the left in the drawing to a point approximately one third along its length there extends a threaded bore 100 passing through the center of slide 38, into which the cable element 52 of the Bowden cable 32 is screwed, for which purpose it is provided with a threaded pin 102 at its end. On that side of the slide 38 which faces the cover 36, a guide groove 106 extending over the entire length of the slide is milled into it, the guide groove being so dimensioned in width and depth that it can engage over both guide studs 88, 90. Through the cooperation of the two guide studs 88, 90 and the guide groove 106, longitudinal guiding of the slide 38 is obtained, so that it is always guided parallel to the bottom rim 46 of the housing 34. The slide 38 also has its top 108 bearing against the retaining element 84 and is also guided by it during its longitudinal movement in the housing 34. An engagement formation in the form of a recess or drive groove 110 extending over the width of the slide 38 is provided in the top 108 thereof, the drive groove merging on both sides into the top 108 by way of a chamfer 112 in each case. Between the chamfer 112 which is towards the inclined surface 98 a small surface is left which corresponds approximately to the width of the drive groove 110. The depth of the drive groove 110 corresponds approximately to the depth of the groove 94 in the retaining element 84.

The driver 40 is composed of a block 114, a compression spring 116, a driving pin 118 and a disc 120. The block 114 has the external shape of a parallelepiped which is closed at its lower end by a cap 122. The thickness of the block corresponds approximately to the distance between the cover 36 and the housing 34, that is to the height of the rim 46. The block 114 is bored through its center in the direction of its longitudinal axis and consequently has a cylindrical guide 124 for the driving pin 118. This guide 124 also extends through the cap 122, so that the driving pin 118 is slidably guided at one end in the block 114 and at the other end in the cap 122. Between the cap 122 and the guide 124 there is provided a bore or opening 126 of larger diameter with respect to the guide 124, into which bore or opening the compression spring 116 is inserted. In simplest form, opening 126 can extend across opposite sides of the block 114 and be made by a milling operation.

At that end of the bore 126 which adjoins the guide 124, the bore has an abutment surface 128. The driving pin 118 therefore extends across opening 126 between the guide 124 in the block 114 and the guide 124 in the cap 122. The disc 120 is fixed on the driving pin 118 at a point about one third along its length near its end 130 which is adjacent cap 122. The disc may be welded onto the driving pin 118 or be retained thereon in an annular groove, which is not shown in detail, however. The compression spring 116 is inserted under initial tension between the disc 120 and the abutment surface 128 and consequently causes the driving pin 118 to be always moved towards the cap 122, so that that end 130 of the driving pin 118 is pushed out of the guide 124 of the cap 122 until the side of disc 120 opposite spring 116 abuts the cap 122. When the disc 120 abuts cap 122, the driving pin 118 projects beyond the cap 122 by an amount at least equal to the depth of the drive groove 110. Preferably, however, it projects by a little more than the depth of the drive groove 110. The driving pin 118 has sufficient length such that when the disc 120 abuts cap 122 the opposite end of the pin is still held in the guide 124.

The cap 122 may be screwed or welded onto the block 114. If an opening 126 is provided in the block 114 instead of a bore and if the disc 120 is held on the driving pin 118 by means of a locking pin or a retaining ring, the cap 122 and the block 114 may then also be formed as one part. In this case, for assembly, the compression spring 116 would first have to be pushed into the opening 126 and then the disc 120 would have to be pushed between the compression spring 116 and the part of the block 114 replacing the cap 122. Then, the driving pin 118 could be pushed through the compression spring 116 and the disc 120 from one of the guides 124, the compression spring 116 compressed towards the abutment surface 128 and the disc 120 secured with respect to the driving pin 118 by means of the locking pin or the like.

On that side of the block 114 which is towards the front 62 of the housing 34, a threaded bore 132 is provided for receiving a connecting pin 134 belonging to the driver 40. This threaded bore 132 is in the form of a blind bore and extends at right angles to the guide 124 in the block 114. The bore is in the form of a blind bore so as to exclude the possibility of the connecting pin 134 being screwed into the guide 124 and preventing the movement of the driving pin 118 therein. Instead of connection by means of the thread, however, the connecting pin 134 could also be welded onto the block 114 or be formed in one piece with it.

The connecting pin 134 extends from the block 114 through the housing 34 and the bearing bushing 82 and has a flattened shank portion 136 projecting beyond the front 62 of the housing 34. In correspondence with the profile of the flattened shank portion 136, an opening 138 is provided in the lever 42 transversely of its longitudinal axis, so that the lever can establish a rotation-proof connection with the connecting pin 134 in the area of its flattened portion. In the region of the transition from the flattened to the unflattened zone of the shank portion 136 an abutment 140 is obtained, against which the lever 42 can be brought to bear. The shank portion 136 is of such a length that, even when it is embraced by the lever 42, it still has a threaded portion 142 projecting beyond the lever. Onto this threaded portion 142 there is screwed a nut 144, by means of which the lever 42 can be fixed in position on the shank portion 136 as a result of its bearing action against the abutment 140. The remote actuating handle or lever 42 is made from a flat steel or a thick sheet metal and has an elongated shape. At its end remote from the connecting pin 134, it is provided with a ball 146 which is pushed or screwed onto it and enables the lever 42 to be gripped more comfortably and easily. Due to the rotation-proof connection of the connecting pin 134 both to the block 114 and to the lever 42, a swinging movement of the lever 42 in the bearing bushing 82 is transmitted directly to the block 114 and causes it to swing likewise at that point. The axis of symmetry of the lever 42 and that of the block 114 extend at an angle of about 45 degrees to one another.

The entire range of swing of the lever 42 is marked in FIG. 2 by the inner circular arc and that part of the range of swing in which the slide 38 can be shifted by means of the lever 42 is marked by the outer circular arc.

The lock 44 is composed of a threaded sleeve 148 with an internal bore 150, a spring 152, a locking pin 154 and a plate 156, the threaded sleeve 148 bearing the thread on its external circumference and being screwable into the annular groove 70 provided with an internal thread in the front 62 of the housing 34. The external diameter of the locking pin 154 corresponds to the internal diameter of the bore 68 in the front 62 of the housing 34 and, during a sliding movement in the direction of its longitudinal axis, it is therefore guided in this bore. The diameter of the internal bore 150 is also almost identical to the diameter of the locking pin 154. The length of the locking pin 154 is so chosen that it constantly extends both through the bore 68 and through the internal bore 150 and then still has an end 158 projecting beyond the threaded sleeve 148. A spherical knob 160 is screwed onto the pin end 158 to facilitate axial shifting of the locking pin 154.

At a point about one third along its length, measured from an end 162 of the locking pin 154, the plate 156 is mounted on the locking pin and is held thereon, for example, by the plate being in the form of an expanding disc which can be pushed into a groove (not shown) about the circumference of the locking pin 154. The plate 156 has an inner side 164 and an outer side 166 and that side which faces the housing 34 in the installed state of the plate is to be regarded as the inner side 164, while that side which faces the spherical knob 160 in the installed state is to be regarded at the outer side 166.

The spring 152 is provided between the plate 156 and the closed end of the threaded sleeve 148 and, in accordance with the preceding description, bears against the outer side 166 of the plate 156. The plate 156 is provided with two apertures 168 which correspond to the size and cross section of the wall 72 arranged on the front 62 of the housing 34 and surrounding the bore 68 concentrically. If the locking pin 154 is rotated so that the apertures 168 are in alignment with the wall 72, the locking pin can then be moved axially and the plate 156 slides around the wall 72. The locking pin 154 is urged towards the housing 34 by the spring 152. In dimensioning the internal diameter of the spring 152, care must be taken that it is larger than the external diameter of the wall 72, so that on axial movement of the locking pin 154 towards the housing 34 the spring does not contact the wall 72 and prevent the locking pin from extending sufficiently far into the housing 34.

Operation

In accordance with what has been described above, operation takes place in the following manner. The description of operation starts from the basis that, tractional resistance adjustment has been chosen as the kind of adjustment; the control lever 26 in the cab 12 has adopted a position which corresponds to the lowest position of the draft links 16; and the driver 40 has been swung until the driving pin 118 comes into abutment in the groove 94 in the retaining element 84. Under these conditions, the slide 38 will fully fill zone 48 of the rectangle. Moreover, the lock 44 adopts a state in which the plate 156 can slide on the wall 72 and is brought into abutment against the front 62 of the housing 34 by the action of the spring 152. In this position, the locking pin 154 extends so far into the housing 34 that it encroaches on the path of movement of the end 130 of the driving pin 118.

Under these conditions, the tractor 10 is now driven backwards by a person up to an implement (not shown), for example a disc harrow, which is to be attached. As soon as the distance between the tractor and the disc harrow is enough to connect it to the draft links 16, the tractor 10 is stopped and the draft links 16 are moved upward until the ball bearing eyes 24 are at about the same height as the coupling points on the disc harrow. Particularly in the case of agricultural tractors 10 with a cab 12 which restricts inspection of the coupling zone, this person can often only estimate whether the height of the ball bearing eyes 24 corresponds to the height of the coupling points on the disc harrow. The person will then climb down from the tractor 10 and go to the back in order to push the draft links 16 with the ball bearing eyes 24 over attachment pins provided on the harrow. If the ball bearing eyes 24 are below the attachment pins, the person will draw the locking pin 154 outward, that is towards the housing 34, by means of the spherical knob 160 until the plate 156 no longer engages over the wall 72. The locking pin 154 is then rotated a little about its longitudinal axis and released, so that the plate 156 is pushed onto the wall 72 under the action of the spring 152, that is into a position in which the locking pin 154 no longer encroaches on the path of movement of the driving pin 118. Looking at FIG. 2, the lever 42 is thereafter swung round to the right, so that the block 114 and the driving pin 118 likewise carry out a counterclockwise rotary movement. This rotary movement produces an axial shifting of the driving pin away from the retaining element 84 and out of the groove 94 and in fact conditioned by the chamfer 96 provided at the side of the groove 94. This axial shifting takes place in opposition to the action of the compression spring 116 and, after leaving the groove 94, the driving pin 118 rests in frictional contact on the inclined surface 92. After a certain degree of swing, the driving pin 118 engages the drive groove 110 in the top 108 of the slide 38 and shifts this from left to right, looking at the drawing. As soon as the slide 38 carries out a longitudinal movement in the rectangular zone of the housing 34, it is transmitted via the cable element 52 of the Bowden cable 32 to the control lever 26, which is then swung proportionally. Through a further swinging of the lever 42 and, consequently, also of the driver 40 in the above mentioned direction of rotation, the slide 38 is moved further until the driving pin 118 moves out of the drive groove 10 again, which occurs when the maximum action circle of the driving pin 118 no longer intersects the top 108 of the slide 38. The slide 38 has then been shifted to such an extent that the control lever 26 in the cab 12 has been swung over its entire dead range. In accordance with what has been described at the beginning, however, no raising of the draft links 16 takes place as long as the control lever 26 moves in the dead range and tractional resistance adjustment has been chosen as the kind of adjustment. Therefore, it cannot happen that the person brings the control lever 26 into the adjustment range and causes the draft links 16 to move upward in an uncontrolled manner. The person will, however, recognize by the reduced force required for swinging the lever 42 that raising of the draft links 16 is not possible with the chosen adjustment function, namely tractional resistance adjustment. Continuous further rotation of the lever 42 is not possible, however, since the driving pin 118 strikes against the stop 86 on the cover 36. In view of all this, the operator must climb onto the tractor 10 again and choose position adjustment as the kind of adjustment. To avoid the draft links 16 being raised to a height corresponding to the position of the control lever 26 in the slotted guide on transfer from the dead range to the adjustment range, the operator should move the control lever at least as far towards the beginning of the slotted guide as it was when the draft links 16 were initially adjusted from the cab 12.

The operator thereupon climbs down again and, via the lever 42, can now swing the control lever 26 proportionally and over almost its entire path of swing. This feature, that is the prevention of raising of the draft links 16 as long as tractional resistance adjustment has been chosen as the kind of adjustment, becomes superfluous if position adjustment has been chosen as the kind of adjustment from the beginning and then every swinging operation of the lever 42 directly produces the raising of the draft links 16.

On termination of remote actuation, the lever 42 is swung back into its initial position, i.e. the position in which the driving pin 118 is held in the groove 94 in the retaining element 84, and the locking pin 154 is pushed into the housing 34. This is achieved in that the locking pin 154 is turned about its longitudinal axis until the apertures 168 in the plate 156 are in alignment with the wall 72, so that the spring 152 pushes the locking pin 154 into the housing 34. The lock 44 does not serve under normal conditions to block the lever 42 in its ability to rotate, which is already achieved by the engagement of the driving pin 118 in groove 94 of the retaining element 84, but it prevents the lever from being swung unintentionally and causing a shifting of the draft links 16.

Of course, the preliminary conditions mentioned at the beginning of the description of operation do not have to be present, but, if the lock 44 has been opened, the lever 42 can be swung into engagement with the slide 38 as long as the range of movement of the driving pin 118 coincides with the drive groove 110 at some point. Until engagement occurs, the driving pin 118 will merely slide along on the top 108 of the slide 38.

Moreover the housing 34 does not have to be mounted on the tractor 10. It is also usefully mounted on the attached implement. In this arrangement the height of the draft links 16 can be determined when the implement is coupled up and also during use to permit the implement to be elevated in optimum manner with respect to the surface of the soil by a person who is on the implement. This would be possible in the use of planting and harvesting machines.

Furthermore, the stop 86 could be omitted and the housing 34 so altered in shape that the block 114 with the driving pin 118 can be swung still further and, in fact, continuously when the slide 38 has adopted its position which corresponds to the top position of the draft links 16, so that the driving pin 118 can be inserted in the groove 94 from the other side of the inclined surface 92.

I claim:

1. A remote actuating mechanism comprising:
   an actuating lever;
   a driver rigidly coupled to said actuating lever for swinging motion therewith and having a spring loaded driving pin; and
   a longitudinally movable transmission unit having a recess for receiving the driving pin in a positively coupled engagement relationship sustainable over a range of movement less than the swinging range of movement of said lever and driver, the spring loading of said driving pin permitting said driver to engage said recess at any position over said range.

2. The remote actuating mechanism according to claim 1, wherein the driving pin is movable in opposition to the action of a compression spring, guided in said driver, and is biased towards the recess.

3. The remote actuating mechanism of claim 1 wherein a retaining element is provided for receiving the driving pin, in opposition to the spring loading acting thereon, when the actuating lever is in an inoperative position.

4. The remote actuating mechanism of claim 3 wherein a lock is provided which prevents the driving pin from leaving the retaining element.

5. The remote actuating mechanism of claim 1 wherein said transmission unit has an initial position at one end of its range of travel and the recess is located in the range of swing of the driving pin when the transmission unit is in its initial position.

6. A remote actuating mechanism for positioning a control lever, said mechanism comprising:
   an axially movable slide having an axial travel limit in at least one direction and an engagement formation located thereon;
   means extending between said slide and said control lever for maintaining simultaneous positioning;
   a pivotally mounted actuating lever;
   a driving assembly rigidly coupled to said actuating lever, said driving assembly including a housing for guiding a pin and retaining a spring for urging said pin out of said housing and into engagement with said formation, said driving assembly having an arrangement allowing said pin to engage said formation over a pivotal range of movement less than the pivotal range of movement of the actuating lever and allowing said pin to engage said formation at said limit of axial travel.

7. The remote actuating mechanism of claim 6 wherein a retaining element is provided for receiving the pin when it is disengaged from the slide and means are provided for preventing the pin from leaving the retaining element.

8. The remote actuating mechanism of claim 6 wherein said control lever provides positional and tractional adjustment to a three-point implement hitch of an agricultural tractor.

9. The remote actuating mechanism of claim 6 wherein said simultaneous positioning means comprises a Bowden cable connected to the control lever and the slide.

* * * * *

UNITED STATES PATENT AND TRADEMARK OFFICE
CERTIFICATE OF CORRECTION

PATENT NO. : 4,713,981

DATED : 22 December 1987

INVENTOR(S) : Werner Zahn

It is certified that error appears in the above-identified patent and that said Letters Patent is hereby corrected as shown below:

Col. 11, line 5, delete "an" and insert -- a swingable --.

Signed and Sealed this

Nineteenth Day of July, 1988

Attest:

DONALD J. QUIGG

Attesting Officer

Commissioner of Patents and Trademarks